(12) United States Patent
Sellers et al.

(10) Patent No.: US 11,724,223 B2
(45) Date of Patent: Aug. 15, 2023

(54) SYSTEMS AND METHODS FOR FORMING MODULAR FILTRATION ASSEMBLIES

(71) Applicant: Stonehouse13Mfg., LLC, Waukesha, WI (US)

(72) Inventors: Mark G. Sellers, Nashotah, WI (US); Brian P. Conrad, Belgium, WI (US)

(73) Assignee: STONEHOUSE13MFG., LLC, Waukesha, WI (US)

( * ) Notice: Subject to any disclaimer, the term of this patent is extended or adjusted under 35 U.S.C. 154(b) by 279 days.

(21) Appl. No.: 16/749,600

(22) Filed: Jan. 22, 2020

(65) Prior Publication Data
US 2021/0220765 A1 Jul. 22, 2021

(51) Int. Cl.
*B01D 35/30* (2006.01)
*B01D 29/13* (2006.01)
*B01D 29/11* (2006.01)

(52) U.S. Cl.
CPC .......... *B01D 35/303* (2013.01); *B01D 29/111* (2013.01); *B01D 29/13* (2013.01); *B01D 35/306* (2013.01); *B01D 2201/0423* (2013.01); *B01D 2201/0446* (2013.01); *B01D 2201/302* (2013.01)

(58) Field of Classification Search
CPC .... B01D 35/303; B01D 29/111; B01D 29/13; B01D 35/306; B01D 2201/0423; B01D 2201/0446; B01D 2201/302; B01D 2201/30
See application file for complete search history.

(56) References Cited

U.S. PATENT DOCUMENTS

| | | | |
|---|---|---|---|
| 4,637,874 A | 1/1987 | Ansteth | |
| 10,584,040 B2* | 3/2020 | Campbell | B01D 35/306 |
| 2007/0000833 A1* | 1/2007 | Levy | C02F 9/005 |
| | | | 210/443 |
| 2008/0185323 A1 | 8/2008 | Kargenian | |
| 2012/0037556 A1 | 2/2012 | Beard et al. | |
| 2013/0043176 A1 | 2/2013 | Johnson et al. | |
| 2015/0354712 A1* | 12/2015 | Jensen | F02M 37/24 |
| | | | 137/625.18 |
| 2016/0144301 A1 | 5/2016 | Tadlock et al. | |

(Continued)

FOREIGN PATENT DOCUMENTS

| | | | | |
|---|---|---|---|---|
| WO | 2009061536 A2 | 5/2009 | | |
| WO | WO-2019036371 A1 * | 2/2019 | | B01D 24/047 |

OTHER PUBLICATIONS

PCT International Search Report for PCT/US2021/014146, dated May 3, 2021.

*Primary Examiner* — Waqaas Ali
(74) *Attorney, Agent, or Firm* — Boyle Fredrickson S.C.

(57) ABSTRACT

A variable configuration modular fluid filter assembly includes one or more discrete filter housing assemblies that each include a mount body constructed to support a cap and a filter sleeve. A plurality of bosses are formed on radially outward facing sides of the mount body and are each discretely selectable to fluidly connect the discrete mount body to one another to provide a desired flow characteristic of the discrete filter assembly arrangement. Preferably, each discrete filter assembly includes a seal arrangement disposed between the cap and the mount body and which orients the sealing interface therebetween at an acute angle relative to an axis of rotation of the cap relative to the mount body when the cap and mount body are engaged with one another.

13 Claims, 8 Drawing Sheets

(56) References Cited

U.S. PATENT DOCUMENTS

2017/0119204 A1 5/2017 Powell
2017/0348639 A1 12/2017 Mizoguchi
2019/0282939 A1 9/2019 Sellers et al.

* cited by examiner

SYSTEMS AND METHODS FOR FORMING MODULAR FILTRATION ASSEMBLIES

BACKGROUND OF THE INVENTION

The present invention relates generally to filtering assemblies, and more particularly, to modular filter assemblies that are constructed to be fluidly connected to one another in a manner wherein volumes and flows through the filter arrangement can be manipulated by an orientation of the discrete filter housings relative to one another.

Filtration of fluid flows is desirable across a litany of industries and has applicability in both commercial and residential environments and enterprises. Merely by way of example, a common fluid flow associated with many commercial and residential applications is the flow of water from a source, via a municipal source such as a water tower, or a rural source, such as a discrete or single residence well. Understandably, the degree of filtration associated with such fluid flows is largely contingent upon the characteristics of the incoming fluid flow, the intended purpose associated with use of the fluid, and the volumes of fluid intended to be filtered. It is appreciated that some commercial, industrial, or residential activities may have less stringent filtration requirements for certain activities, such as for vehicle or equipment wash downs or the like, non-potable applications, such as crop or lawn watering or the like, etc., and more stringent filtration demands, such as for chemical mixings, potable water uses, etc. Understandably, the degree of filtration or manipulation of the quantity or characteristics of the fluid flow necessary to achieve a desired filtration condition of such fluid flows will be largely affected by the quality or condition of the incoming fluid flows as well as the volumetric fluid flow demands.

Regardless of the intended use or application, it should be further appreciated that the filtration demands associated with any fluid flow are infrequently provided in a steady-state condition. That is, it is appreciated that the condition or characteristics of incoming flows change as a function of time as may the desires or intended use associated with consumption or use of the filtered flow and/or the materials filtered from the fluid flows. Many filtration systems are provided in a fixed form factor wherein the degree of filtration associated with the given flows offers only a very limited degree of manipulation associated with installation and operation of the respective filtration systems and/or the desired characteristics of the flow upon egress from the filter assembly. Commonly, the only degree of adjustability associated with a previously configured filtration system is the replacement of the filter media and/or omission of the same during subsequent use of the filtration system as the conditions associated with the incoming flow or the demand or desired characteristics associated with the outgoing flow change. Such concerns can unduly increase the cost associated with the manufacture and installation of the discrete filter systems and/or the costs associated with operation and maintenance of such systems.

Although many of the examples provided above generally relate to filter methodologies associated with water fluid flows, it is appreciated that such filtration systems can be employed to manipulate the conditions or composition of fluid flows beyond providing potable water flows. Commonly, such filtration systems include one or more replaceable or interchangeable filter media that are each configured to remove or otherwise capture particulate matter, chemical elements such as iron or the like, and/or biological elements or compounds. As disclosed above, the conditions associated with the discrete fluid flow source, as well as the desired condition of the resultant filtered fluid flow, renders many filtration systems ill-suited for applicability with more than a discrete set of fluid flow inflow and desired outflow conditions. As such, users are customarily left with the limited option of purchasing, servicing and maintaining greater filtration capability than would otherwise be necessary or tolerating poorer filtration performance than is desired.

For instance, when employed for agricultural irrigation objectives, it may periodically be desired to present or maintain desired or intended chemical levels, such as nitrites, nitrates, phosphates, etc., or herbicides, depending upon the objective of promoting, or terminating, plant growth or propagation. Known fluid treatment or conditioning systems are frequently ill-equipped to be configured or adapted for uses other than the objectives associated with the initial configuration associated with the discrete treatment system.

Still further complicating the construction and operation of such fluid filtration or conditioning systems, each discrete filter housing is commonly configured to communicate a discrete fluid flow in only one operational direction. Unfortunately, not all filter media can be provided in a form factor wherein the filter media can provide the desired filtration performance when subjected to fluid flow parameters suitable for other filter assembly configurations. For instance, for an application wherein a filter assembly is configured to gradually removal smaller and smaller granular or particulate matter from a fluid flow, it may be desirable to introduce the fluid flow filter media having finer and finer particle filtration performance. However, the respective fluid flow parameters associated with such filtration methodologies is commonly dictated by the flow parameter associated with the poorest performing filter arrangement. That is, whereas a discrete filter media may be capable of accommodating greater fluid flow characteristics, the greatest available fluid flow value associated with a discrete fluid flow filter assembly will be limited to the greatest fluid flow value associated with the most constrictive or polluted filter media associated with the discrete filtration system arrangement. Such concerns can be exacerbated in those configurations wherein total fluid flow characteristics associated with a desired fluid filter assembly is limited by the configurations in which the discrete filter housing assemblies can be associated with or otherwise fluidly connected to one another.

During operation of such fluid treatment systems, as the filter media associated with each discrete filter assembly captures more undesired material or content from the fluid flow, the discrete filter media becomes more polluted—as intended, but also directly effects the characteristics of the fluid flow through the filter assembly. As the discrete filter media arrest or otherwise capture materials from the fluid flow, the fluid flow characteristics, such as discrete flow rates, discrete fluid flow pressures, discrete flow volumes, relative degrees of turbulent or laminar flow states, steady or unsteady fluid flow characteristics, uniform to non-uniform fluid flow characteristics, etc., of the fluid flow directed through the discrete filter assemblies. Deviations of the fluid flow characteristics can adversely affect the filtering performance of one or more of the respective filter assembly and can also adversely affect a desired sealed condition of the discrete filter housing assemblies due to unanticipated changes to the pressure and flow characteristics of a given filter assembly associated with a discrete filtration system.

Accordingly, needs exist for a fluid filtration system or filter housing assembly that provides a compact form factor and can be expeditiously configured to satisfy the demands of unique application specific filtration needs and do so in manner that accommodates the fluid flow characteristics attenuate to a particular fluid treatment endeavor. There is a further need for a filter assembly that can be individually tailored to specific filtration needs and does so in a manner that provides improved uniformity or improved interchangeability between the discrete structures associated with forming a desired filter assembly and does so in a manner that maintains the desired sealed conditions of each filter housing assembly and does so even during changing operational conditions.

SUMMARY OF THE INVENTION

The present invention provides a modular fluid filtration system or filter assembly that overcomes one or more of the drawbacks discussed above. One aspect of the present invention discloses a variable configuration modular fluid filtering assembly that includes one or more discrete filter housing assemblies. Each filter housing assembly includes a mount body that is constructed to support a cap and a filter sleeve. A plurality of bosses are formed on radially outward facing sides of the mount body and are each discretely selectable to fluidly connect the discrete mount body to one another to provide a desired flow characteristic of the discrete filter assembly arrangement. Preferably, each discrete filter assembly includes a seal arrangement disposed between the cap and the mount body and which orients the sealing interface therebetween at an acute angle relative to an axis of rotation of the cap relative to the mount body when the cap and mount body are engaged with one another. Such a fluid filtering assembly can be quickly and conveniently configured to achieve a desired filtration performance and serviceable in a manner that improves the ability to seal each filter housing assembly during service operation.

Another aspect of the present invention that is combinable with one or more of the features, aspects, or objects of the aspect disclosed above includes a fluid filtering assembly having a support housing. At least one fluid inlet boss and at least one fluid outlet boss are each formed in a radially outward directed surface of the support housing. A filter sleeve extends in a first direction from the support housing and has an elongate shape that is constructed to accommodate a filter being disposed therein. The assembly includes a top cap that threadably cooperates with the support housing from a direction opposite the filter sleeve and engages the filter sleeve. An inlet fluid flow passage and an outlet fluid flow passage are defined by the top cap and oriented to be respectively fluidly aligned with the at least one fluid inlet boss and the at least one fluid outlet boss when the top cap is engaged with the support housing and the filter media is disposed in the filter sleeve.

A further aspect of the present application that is combinable or useable with one or more of the features, aspects, or objects of the aspects disclosed above includes a fluid filtering assembly having a mount body and at least one fluid flow inlet boss and at least one fluid flow outlet boss formed in an outward radially directed surface of the mount body. The assembly includes a filter sleeve that extends away from the mount body and which defines a blind opening that is shaped to receive a filter. The assembly further includes a cover that is removable and sealingly cooperates with a bore formed in the mount body from a direction opposite the filter sleeve via cooperation of a threaded surface formed on a radially outward surface of the cover and a threaded surface formed on a radially inward facing surface of the mount body. A channel is axially offset from the threaded surfaces of the cover and the mount body is formed in one of the mount body and cover and a seal is disposed in the channel. A seat is defined by the other of the mount body and the cover and is oriented to engage the seal when the cover is engaged with the mount body such that the seat and the seal engage one another at an acute angle relative to an axis of rotation of the cover relative to the mount body when the threaded surfaces are engaged with one another.

Another aspect of the present invention that is useable or combinable with one or more of the features, aspects, or objects disclosed above includes a method of forming a filter housing assembly. The method includes providing a mount body that is defined by a bore that passes through the mount body. A plurality of bosses are formed on a radially outward oriented surface of the mount body and oriented such that at least one of the plurality of bosses is constructed to be able to provide a discrete flow cross-section from a range of flow cross-sections. A cap that removeably and sealingly cooperates with a respective end of the bore of the mount body is provided and is shaped to engage a filter to direct a fluid flow passed into the mount body from an opening associated with one of the plurality of bosses to another opening associated with another of the plurality of bosses.

These and other various aspects, features, and advantages may apply to some or all of the embodiments falling within the claims and thus do not define the scope of the present invention.

BRIEF DESCRIPTION OF THE DRAWINGS

The drawings illustrate preferred embodiments presently contemplated for carrying out the invention and show various views of the filter systems or assemblies and discrete components thereof according to the present invention.

Figure 1:
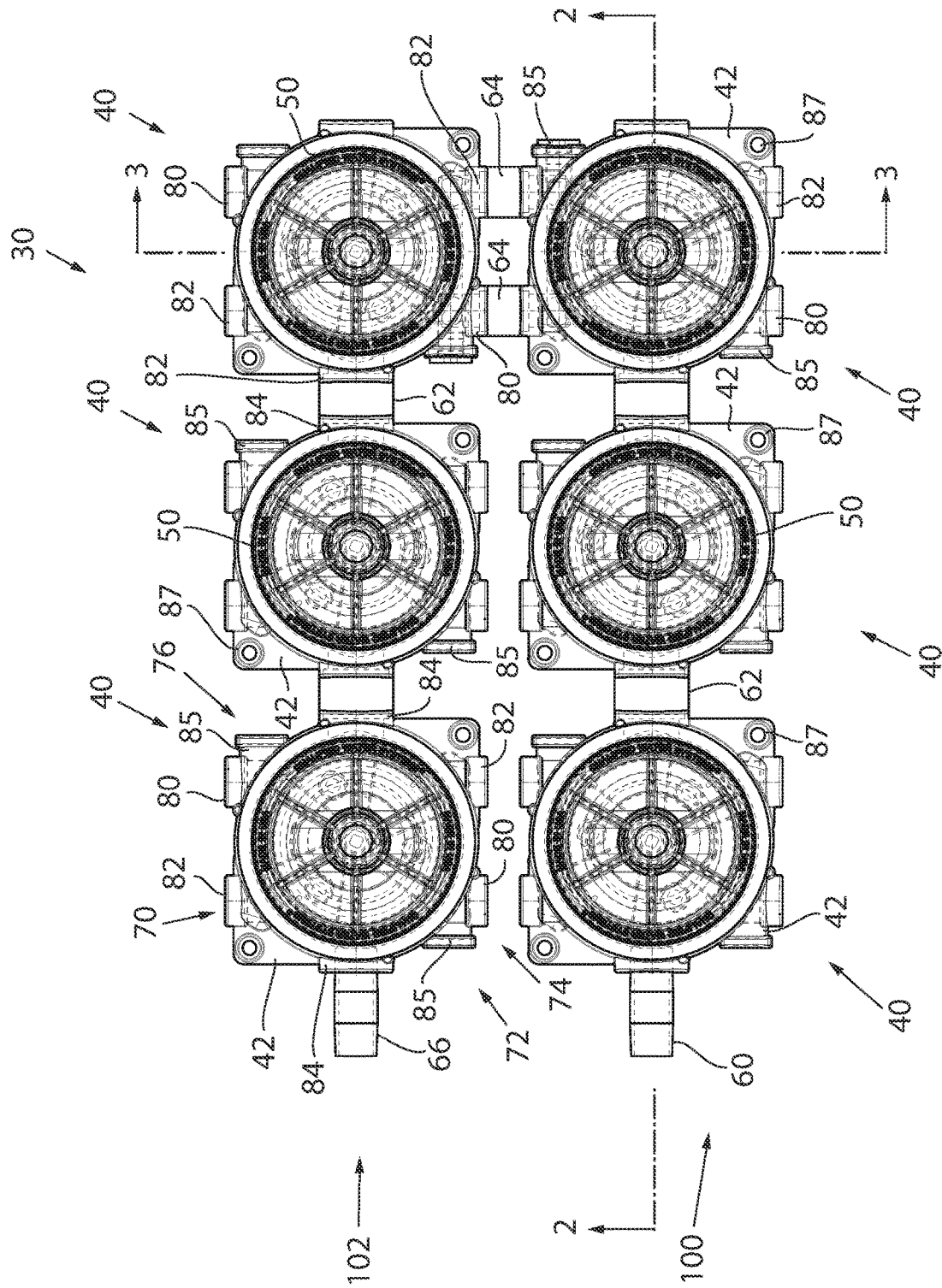
FIG. 1 is a top plan view of a filter system assembly according to the present invention.

In describing the preferred embodiments of the invention which are illustrated in the drawings, specific terminology is resorted to for the sake of clarity. However, it is not intended that the invention be limited to the specific terms so selected and it is to be understood that each specific term includes all technical equivalents which operate in a similar manner to accomplish a similar purpose. For example, the words connected, secured, attached or terms similar thereto are often used. They are not limited to direct connection unless otherwise specified but include connection through other elements where such connection is recognized as being equivalent by those skilled in the art.

DETAILED DESCRIPTION OF THE PREFERRED EMBODIMENT

Figure 2:
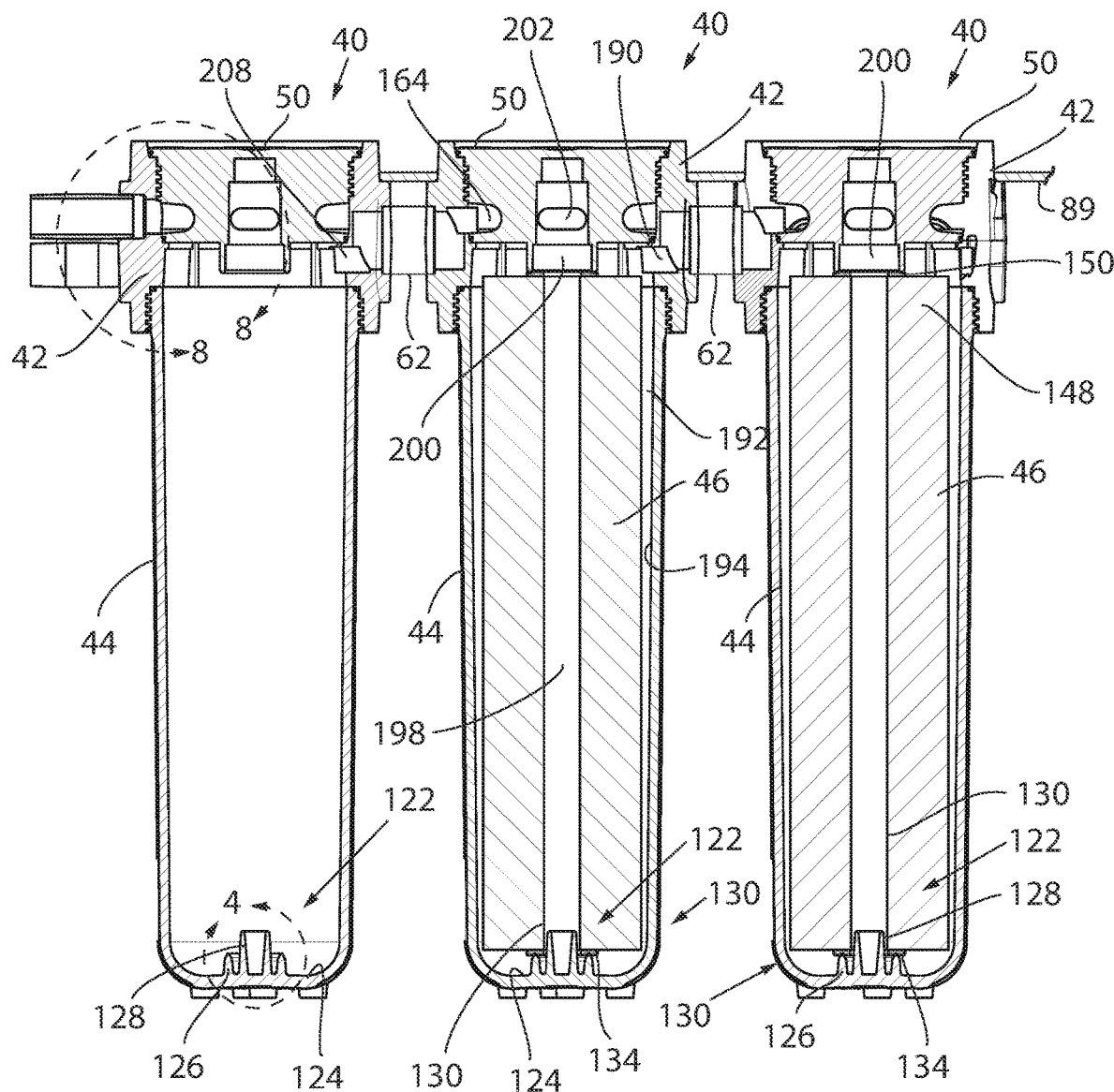
FIG. 2 is a cross section elevation view of the filter assembly taken along line 2-2 shown in FIG. 1.
Figure 3:
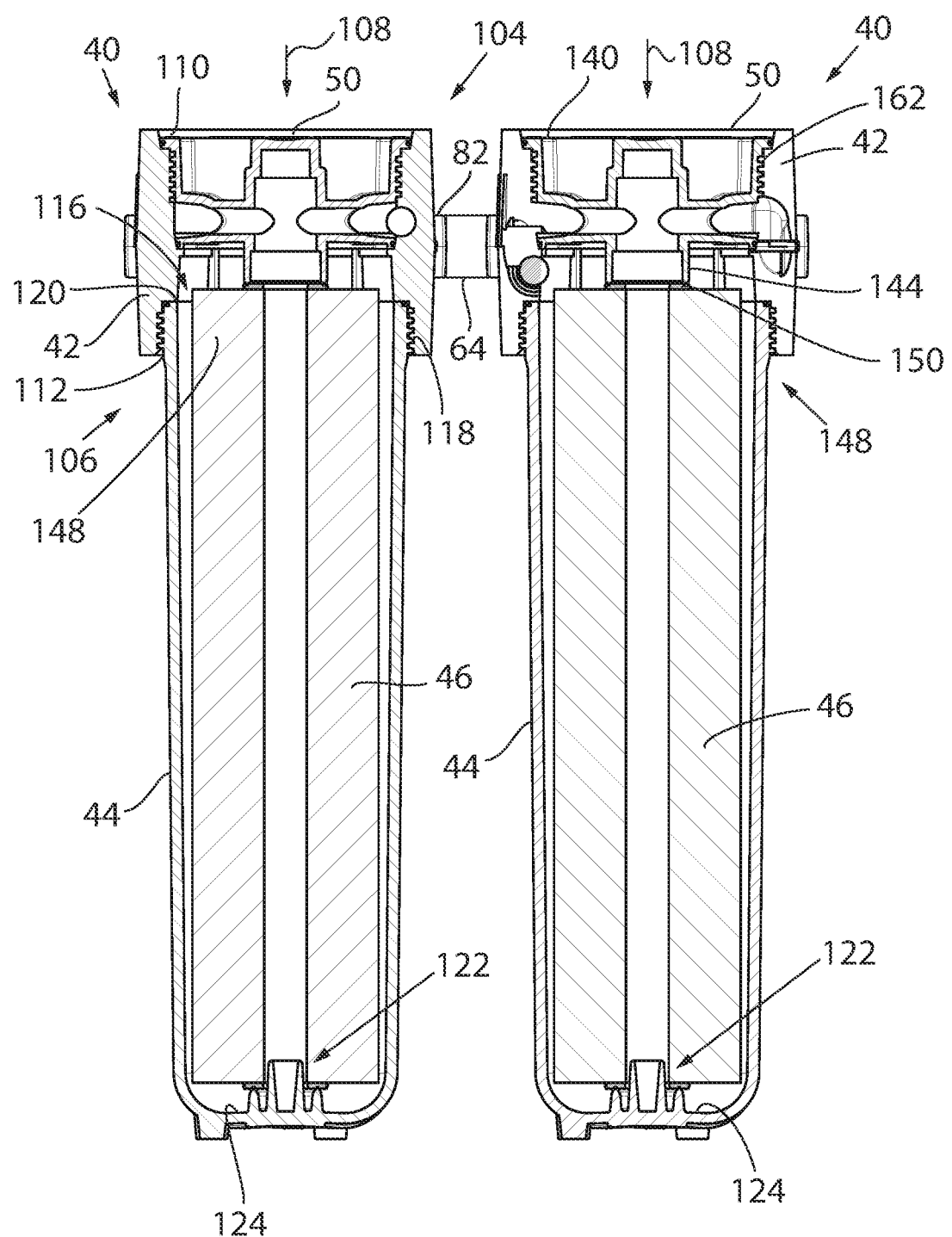
FIG. 3 is a view similar to FIG. 2 taken along line 3-3 shown in FIG. 1.

FIGS. 1-3 show various views of a filter or filtration or filtering system or filtering assembly 30 according to one embodiment of the present invention. Filtering assembly 30 preferable includes a plurality of discrete filter housings or simply filter assemblies 40 that are each constructed to be selectively fluidly connected to one or more other discrete filter housings or filter assemblies 40 in order to form a respective filtering assembly 30 although it should be appreciated that, depending upon the initial condition of the fluid to be filtered, and the resultant condition to be achieved by the filtration process, there may be instance wherein one filter assembly 40 defines a discrete filtering assembly 30 although such instances are envisioned to be rare.

Regardless of the number fluidly connected to one another and prior to the individualization of each discrete filter assembly 40, each filter assembly 40 is preferably similarly constructed such that each discrete filter assembly 40 can be configured to be disposed in any discrete respective position relative to one or more other filter assemblies 40 associated with forming a respective resultant or desired filtering assembly 30 configuration. As disclosed further below, and with respect to a comparison of filtering assembly 30 shown in FIGS. 1-3 and the filtering assembly as disclosed below with respect to FIGS. 11 and 12, it should be appreciated that each of discrete filter assemblies 40 are provided in a modular construction such that any discrete filter assembly 40 can be configured to attain any relative discrete filter assembly flow position relative to the other discrete filter assemblies 40 associated with providing a desired resultant filtering assembly 30 and to provide a desired or necessary degree of filtration associated with the communication of a fluid therethrough.

Still referring to FIGS. 1-3, each filter assembly 40 includes a head or support housing, top portion, or mount body 42 that cooperates with and supports a filter sleeve or tube 44 that is configured to generally enclose a majority of a respective filter media, filter element, or simply filter 46, and a respective top cap or simply cap, bung, cover, or lid 50. As disclosed in further detail below, each mount body 42, tube 44, and lid 50 of each respective filter assembly 40 is shaped to cooperate with one another in a sealing manner so as to capture a respective filter 46 in a sealed manner generally therebetween. As disclosed further below, it is appreciated that each of tubes 44 and lids 50 are constructed to interchangeably cooperate with any mount body 42 associated with filtering assembly 30. Such a consideration improves the versatility associated with use and operation of filtering assembly and mitigates concerns associated with providing replaceable and/or serviceable components thereof. For instance, manufacturers need only manufacture one filter tube 44 and one lid 50 that can cooperate with any discrete mount body 42 associated with any filtering assembly 30.

Still referring to FIGS. 1-3, filtering assembly 30 includes one or more couplers, couplings, or fittings 60, 62, 64, 66 that facilitate fluid connectivity to, or between, discrete mount bodies 42 associated with discrete filter assemblies 40 to effectuate a desired fluid connectivity therebetween in accordance with a desired fluid flow path or paths through discrete filter assemblies 40 of a respective filtering system or assembly 30. As disclosed further below, it is appreciated that each of fittings 60, 62, 64, 66 can be supported by discrete portions of the respective mount body 42 or otherwise captured therebetween so as to provide a sealed interaction between adjacent filter assemblies 40 associated with a discrete filtering assembly 30. In a preferred aspect, fittings 60, 62, 64, 66 are secured to and engage with respective mount bodies 42 associated with a discrete filtering assembly 30 so as to tolerate the physical and fluid interaction therewith.

In an alternative embodiment, one or more support plates, as disclosed further below with respect to FIGS. 11-12, may be employed to provide a robust securing mechanism with which respective filter assemblies 40 can be physically secured relative to one another and thereby improving the isolation of discrete fittings 60, 62, 64, 66 associated with a discrete filtering assembly 30 from physical and hydraulic forces associated with use, interaction, and operation of discrete filtering assembly 30 when deployed and regardless of the total number of filter assemblies 40 employed to achieve a desired filtration performance. To this end, each filter assembly includes one or more fasteners 87 that can be employed to secure a respective filtering assembly 30, via their respective mount bodies 42, to a mounting arrangement or the like such as a support plate 89 (FIG. 2) as disclosed further below. Regardless of any support arrangement being employed, each respective filter tube 44 and each respective lid 50 of each respective filter assembly 40 preferably remains independently removable and/or engagable with the respective mount body 42 with which they cooperate without interference or manipulation of the support arrangement. Such considers allow the user to interact with each discrete filter assembly 40 associated with a discrete filtering assembly 30 in a manner that maintains the operation of the underlying filtering assembly 30.

Referring to FIG. 1, each mount body 42 is preferably defined by respective side faces 70, 72, 74, 76 that are each oriented in radially outward directed and preferably orthogonally oriented facing sides thereof. One or more of side faces 70, 72, 74, 76 preferably include one or more bosses 80, 82, 84, 85 that are associated therewith and which are formed during the manufacturer of each mount body 42. During the formation of each respective mount body 42, each of respective bosses 80, 82, 84, 85 are preferably formed in a solid or non-perforated manner during formation of each discrete mount body 42. Upon selection of a desired filter arrangement, more than one of discrete bosses 80, 82, 84, 85 of each discrete mount body 42 are perforated and/or otherwise subsequently machined so as to accommodate, in a sealed manner, engagement with a respective one of fittings 60, 62, 64, 66. As disclosed further below, it should be appreciated that bosses 80, 82 are oriented in a common side face 70, 72, 74, 76 of a respective mount body 42 whereas bosses 84, 85 are oriented in the generally opposite axial sides thereof and provided in a one fluidly connected boss-per-side orientation as bosses 85 remain non-utilized in the configuration shown in FIGS. 1-3.

With respect to the relative configuration of filtering assembly 30 shown in FIGS. 1-3, it should be appreciated that one of fittings 60, 66 provide a fluid inlet associated with circulation of fluid through filtering assembly 30 whereas the alternate fitting 66 provides the fluid outlet associated with operation thereof. From the configuration shown in FIG. 1, it should be appreciated that filtering assembly 30 shown therein is configured so as to provide a single fluid flow path therethrough. That is, fluid directed into the discrete coupler or fitting 66 flows in a counterclockwise direction through a first row 100 of three sequentially oriented filter assemblies 40 and into a second row 102 of another three discrete filter assemblies 40 via fluid fitting 64. Said in another way, the plurality of filter assemblies 40 shown in FIG. 1 are oriented into respective upper and lower rows of a plurality of discrete filter assemblies 40. It should be appreciated that placement of the discrete filters associated with the filtering assembly 30 shown in FIG. 1 can be manipulated in such that a manner that the direction of the fluid flow through the filtering assembly 30 could be conveniently reversed to flow from the upper or first row 100 of filter assemblies 40 to the lower or second row of filter assemblies 40. It should be further appreciated that although the orientation of the plurality of filter assemblies 40 in the manner shown in FIG. 1 provides a linear fluid flow through filtering assembly 30, as disclosed further below, it is appreciated that selectively perforating desired bosses 80, 82, 84, 85 associated with discrete mount bodies of 42 discrete filter assemblies 40 allows filtering assembly 30 the be provided in virtually any shape and/or configuration and/or with various alternate numbers and discrete quantities of respective filter assemblies 40.

Referring to FIGS. 2 and 3, each mount body 42 includes an upward directed surface 104 and a generally downward directed surface 106. Each mount body 42 defines a throughbore along axis 108 such that each respective lid 50 rotatably cooperates with an upward directed opening 110 formed therein and a respective filter tube 44 preferably threadably cooperates with the downward directed opening 112 defined thereby. Each filter tube 44 is generally defined by an upwardly directed blind opening 116 having one or more threads 118 formed about an open end 120 thereof. With respect to the interior cavity of each filter tube 44, a seat 122 preferably extends in a generally upward direction from a bottom 124 of each discrete filter tube 44.

Figure 4:
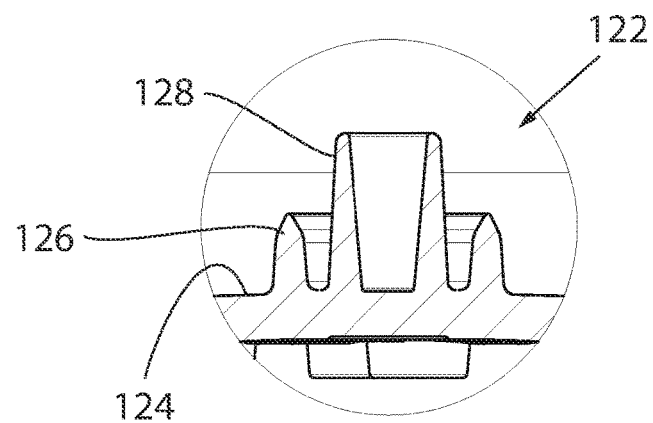
FIG. 4 is a detail elevation cross section view of a lower portion of a filter sleeve taken along line 4-4 shown in 2.

As shown in FIGS. 2-4, each seat 122 is generally defined by a first projection 126 and a second projection 128 that are generally concentrically oriented relative to one another. Projections 126, 128 are oriented to cooperate with a respective longitudinal end 130 of a respective filter 46 associated with the respective filter tube 44. Projection 128 extends into the interior cavity 132 associated with a discrete filter 46 and a seal 134 associated therewith rests upon projection 126. Projection 128 ensures the respective filter 46 is generally longitudinally centrally disposed within the respective filter tube 44 and such that seal 134 engages projection 126. When engaged therewith, it should be appreciated that the cooperation of end 130 of filter 46 with seat 122 prevents or mitigates the passage of fluid through filter assembly 40 in a manner that bypasses the filtering operation associated with the respective filter 46. That is, the sealed interaction between the end 130 of filter 46 and the interior face of tube 44 forces the flow of fluid through filter assembly 40 from areas circumferential around the discrete filter 46, through the media of the filter, and therefrom from a core of the filter 46 before egressing the discrete filter assembly 40. That is, each end 130 of each filter 46 is constructed to cooperate with seat 122 such that fluid flow directed through discrete filter assemblies 40 must pass through the media associated with each discrete filter 46 to pass between the inlet and the respective outlet of each respective filter assembly 40. Such a consideration ensures that the fluid directed through a discrete filter assembly 40 interacts with the media of each discrete filter 46 thereby filtering the fluid flow rather than bypassing the media of the discrete filter 46.

Upwardly oriented or directed opening 52 defined by each mount body 42 removeably cooperates with a respective lid 50 and is constructed to allow a discrete filter 46 associated with a respective filter assembly 40 to be removed, serviced, and/or replaced without interference or user interaction with any of the other of the filter assemblies 40 associated with a respective filtering system. It is further appreciated that, during service operations, discrete filters 46 can be removed and/or replaced by filters having similar or dissimilar constructions relative to a recently removed filter 46 and as a function of the fluid filtering performance associated with operation of filtering assembly 30. It is appreciated that the construction and operation of filters 46 can be provided in various modalities associated with the materials, elements, chemicals, and/or organisms they are configured to remove from, or in some cases introduce to, a flow of fluid through a respective filter assembly or filtering assembly 30 as defined by a plurality of filter assemblies 40 that are fluidly connected to one another.

Referring to FIGS. 2, 3, 5, and 6, each lid 50 includes an upwardly directed surface 140 and a filter facing surface 142 that are oriented at the generally opposite axial ends thereof. A projection 144 extends from the filter facing side 142 of each respective lid 50 and is oriented to engage in upwardly directed end 148 of each respective filter 46 associated with a respective filter assembly 40. Preferably, a gasket or seal 150 is associated with upper end 148 of respective filter 46 and seats upon a terminal end 152 of lid 50 when lid 50 is engaged with a respective mount body 42. Like the engagement between filter 46 and seat 122, the engagement between lid 50 and the upwardly directed end 148 of filter 46 provides a fluidly sealed interaction in the radial direction between lid 50 and the respective filter 46 associated therewith. As disclosed further below, lid 50 cooperates with each mount body 42 so as to effectuate the desired fluid communication between discrete perforated bosses 80, 82, 84, 85 during the formation of a filtering assembly 30 and such that the fluid flow directed therethrough and associated with any discrete filter assembly 40 is oriented to flow in a radial direction through the discrete filter 46 associated with each discrete filter assembly 40.

Figure 5:
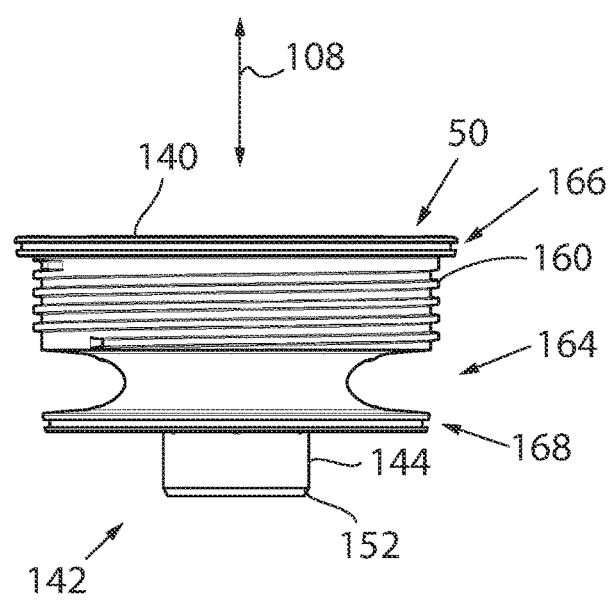
FIG. 5 is an elevation view of a cap removed from one of the discrete filter housings of the filter assembly shown in FIG. 1.
Figure 6:
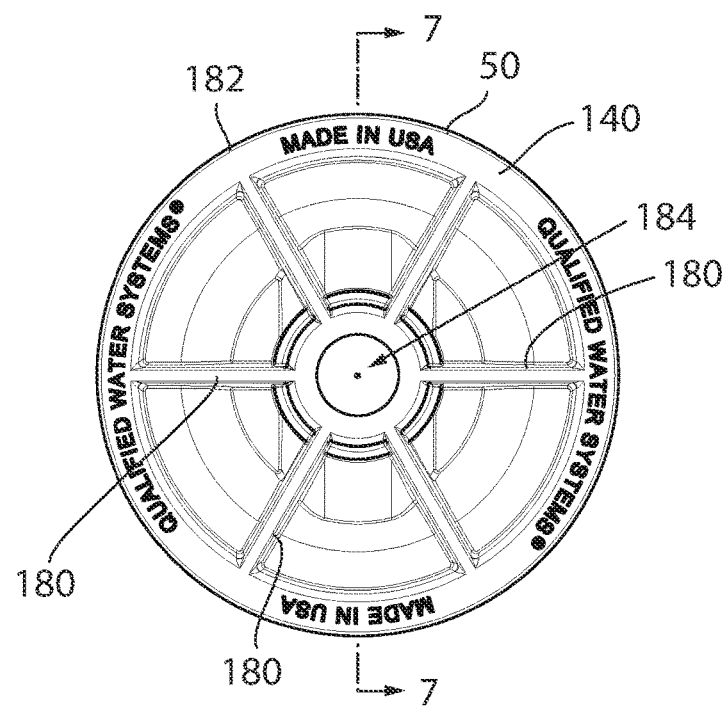
FIG. 6 is a top plan view of the cap shown in FIG. 5.

Referring to FIG. 5, each lid 50 includes a threaded surface 160 that operatively cooperates with a threaded surface 162 associated with the upwardly directed end of each respective mount body 42. Each lid 50 includes a flow channel 164 that is generally oriented about at least a portion of the circumference thereof and generally oriented nearer a respective filter tube 44 relative to an underlying respective threaded portion 160. Threaded portion 160 and flow channel 164 are generally flanked, relative to an axial direction aligned with the axis of rotation associated with the rotational cooperation between each respective lid 50 and the underlying mount body 42, by a first groove 166 and a second groove 168 that are defined by lid 50 and oriented at outward radial edges thereof. It is appreciated that grooves 166, 168 could alternatively be formed by radially inward directed surfaces of each respective mount body 42 so as to provide the selective sealed and segregations of the fluid path directed therethrough.

Whether defined by each respective lid 50 or the corresponding mount body 42, grooves 166, 168 are shaped to cooperate with a sealing element or seals 210, 212, such as an O-ring or the like, to effectuate the desired sealed cooperation of lid 50 with respective mount body 42 and to achieve the desired flow path therethrough. A plurality of threads associated with threaded portion 160 of lid 50 are preferably provided at 0.250 inch thread pitch and have a first thread start orientation of approximately 0.133 inch that is oriented radially downward relative to a lower edge associated with groove 166. Such considerations mitigate and/or eliminate instances of cross-threading between threaded portion 160 of lid 50 and the threaded portion of mount body 42. Such considerations ensure each lid 50 fully seats relative to a discrete mount body 42 in a sealed interaction with the respective filter 46 associated therewith and provides a sealed interaction between each lid 50 and the respective underlying mount body 42.

Figure 7:
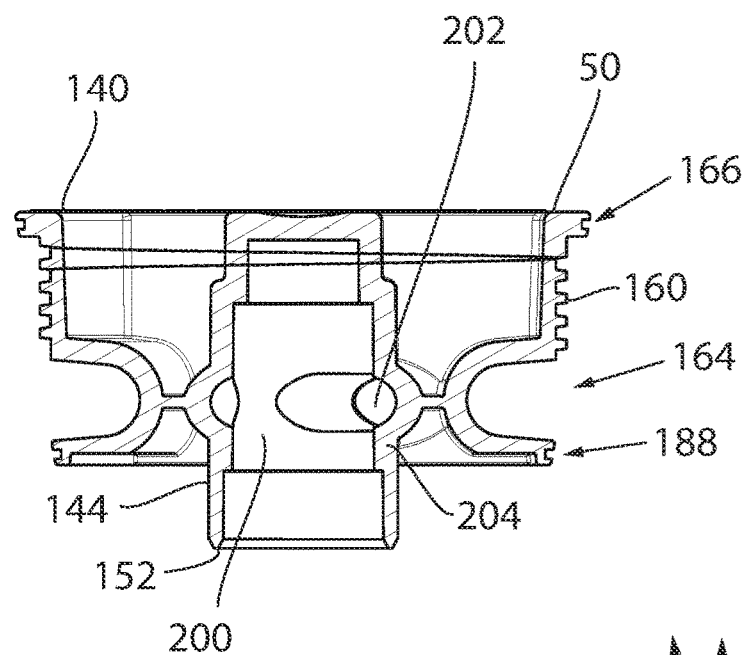
FIG. 7 is a cross section view of the cap shown in FIG. 5 taken along line 7-7 shown in FIG. 6.

In a preferred aspect, the plurality of threads associated with threaded portion 160 are provided in a slightly modified Acme standard thread. Referring to FIG. 7, the outwardly directed top surface 140 of each discrete lid 50 preferably includes one or more webs 180 that are oriented to extend in the generally radial direction between an outer perimeter 182 and an axial center portion 184 associated with each discrete lid 50. Webs 180 provide a robust construction of lid 50 and mitigate distortion of the lid 50 during manufacturing processes, such as molding operations or the like, and/or operation of the filtering assembly 30 and the fluid flow temperatures and pressures associated therewith. Such concerns ensure lid 50, and more particularly seals 210, 212 associated therewith, maintain a desired sealed interaction with the respective mount body 42 with which the respective lid 50 is engaged.

Referring to FIGS. 2 and 7, in addition to the sealed closure associated with the upwardly directed end of the respective underlying mount body 42, respective lids 50 cooperate with respective mount bodies 42, and the upwardly directed portion of the through-bore defined thereby, to define a desired fluid conductivity or fluid path therethrough with respect to flow channel 164 and sealed channel 168 when each respective lid 50 is engage with each respective mount body 42 of a filtering assembly 30 and with respect to the relative radial sides of an underlying filter 46.

Referring to the centrally disposed filter assembly 40 associated with arrangement of filter assemblies 40 of the discrete arrangement of the filtering assembly 30 shown in FIG. 2, fitting 62 oriented toward the right-hand side of mount body 42 of center filter assembly 40 is fluidly connected via a passage 190 to a fluid cavity 192 that extends about filter 46 and is disposed between filter 46 and an interior wall 194 of filter tube 44. Said in another way, the fluid passage 190 associated with the upstream side of filter 46 is fluidly connected to the fitting oriented to the right hand side of center body 42. The cooperation of filter 46 with seat 122 forces fluid directed through filter assembly 40 to pass through filter 46 via cavity 192 and toward a central cavity 198 defined by filter 46. It is appreciated that the direction of the flow through one or more of filter assemblies 40 can be provided in a first preferred filtering condition or a second direction associated with back flushing operation of the discrete deployed filters 46 and/or for fluid treatment processes wherein chemicals or other materials are intended to be deposited into the fluid flow discharged from a respective filtering assembly 30.

Regardless of the direction of the fluid flow, central cavity 198 of each filter 46 is fluidly connected to a centrally located chamber 200 that is defined by each respective lid 50. A passage 202 extends in a radial direction through a body 204 of lid 50 and is fluidly connected to channel 164 defined thereby and disposed between grooves 166, 168 associated with respective seals 210, 212 as disclosed further below. Fitting 62 oriented toward the left-hand side of the centrally disposed filter assembly 40 of the arrangement shown in FIG. 2 is fluidly connected to channel 164 defined by the cooperation of lid 50 and mount body 42 such that fluid communicated thereby is communicated to a subsequent (or preceding depending upon the desired or discrete fluid flow direction) passage 208 associated with an adjacent filter assembly 40. Such a construction ensures that the fluid flow directed through filtering assembly 30 is communicated through each of the discrete filters 46 rather than allowed to bypass therethrough.

Although the description above is directed to a flow in a common direction through more than one filter assembly, each of bosses 80, 82, 84, 85 associated with each mount body 42 is oriented, configured, and constructed to be selectively discretely fluidly connected more directly to the radially inboard or radially outboard locations of the fluid flow associated with each discrete filter 46. As disclosed further below, such considerations allow each filter assembly 40 to be configured to accommodate inlet and/or outlet fluid flows at respective sides of discrete mount bodies that are generally aligned and/or oriented opposite one another, oriented on a common side of each discrete filter assembly, or oriented at crossing directions relative to one another or are associated with adjacent sides of a respective mount body 42 of a respective filter assembly 40. Such considerations allow division of outlet fluid flows between discrete mount bodies to accommodate alternate flow rates associated with each discrete upstream or downstream filter assembly 40. For instance, where one filter assembly 40 is capable of accommodating flow rates of 40 gallons per minute but upstream or downstream filter assemblies 40 are more desirably operable at alternate flow rates, one or more of bosses 80, 82, 84, 85 can be fluidly connected to other filter assemblies 40 such that the flow from or to one filter assembly 40 may be the combination, or division, of flow(s) from one or more adjacent filter assemblies 40 associated with a discrete filtering assembly 30. Such considerations further allow the formation of filtering assembly 30 wherein fluid dwell times within discrete filter assemblies can be manipulated, such as by dividing the flow from a more flow tolerate filter assembly 40 multiple times and communicating the same to subsequent filter assemblies 40 associated with a discrete filtering assembly 30.

Figure 8:
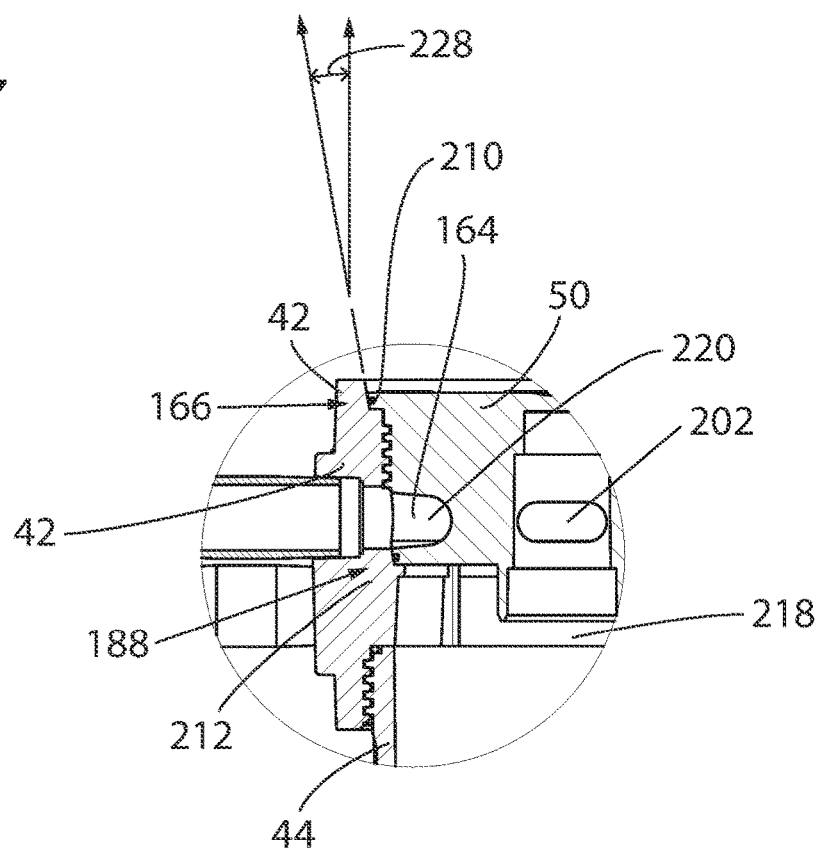
FIG. 8 is a cross section detail view showing the cap engaged with a housing taken along line 8-8 shown in FIG. 2.
Figure 9:
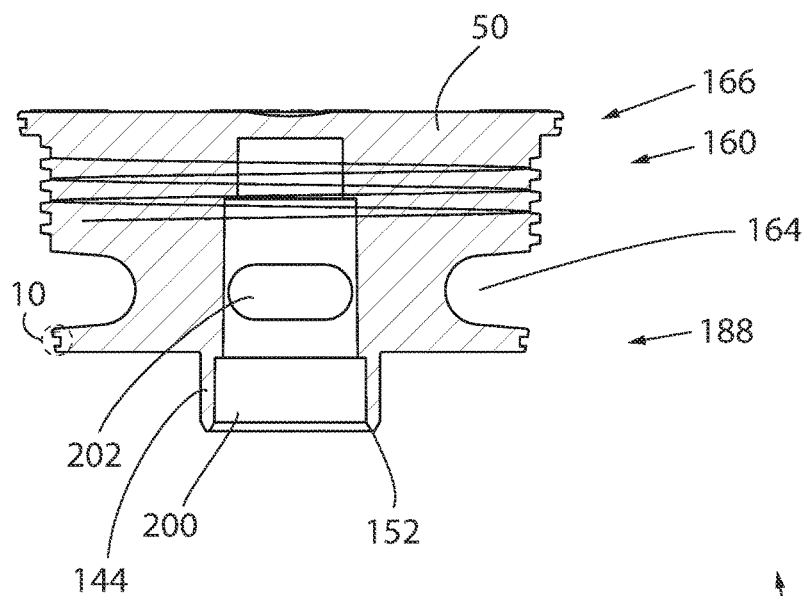
FIG. 9 is a cross section view of the cap taken along an axis orthogonal to line 7-7 shown in FIG. 6.
Figure 10:
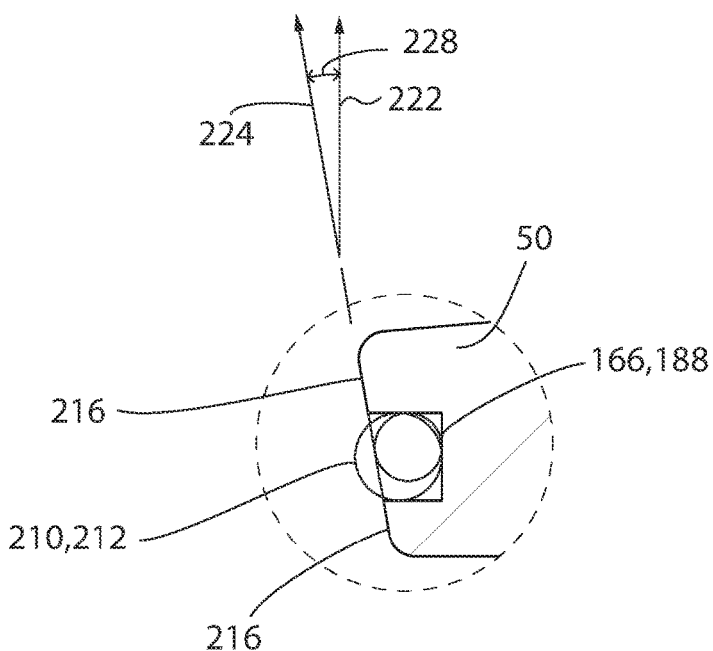
FIG. 10 is an enlarged detail view of a lower cap seal assembly taken along boundary line 10-10 shown in FIG. 9.

As shown in FIG. 8, respective seals 210, 212, such as O-rings or the like, are disposed in each channel 166, 168 defined by lid 50 and oriented to engage respective radially inward directed surfaces of mount body 42 at locations that are opposite channel 164 and chamber 200. Referring to FIGS. 8-10, the generally radially outward circumferentially oriented face 216 of each lid 50 extends to each of channels 166, 168 such that the respective seals 210, 212 can be received therein. Each seal 210, 212 extends slightly radially beyond the radially outward oriented face 216 of each lid 50. Respective seals 210, 212 engage radially inward facing surfaces of respective mount bodies 42 such that each lid 50 segregates a filter facing portion of the fluid path 218 and a respective upstream or downstream portion, depending upon the desired fluid flow direction, of the fluid path 220 such that passage 202 defined by each lid 50 communicates the fluid flow respectively, between the respective inlets or outlets more directly fluidly connected to channel 164 and the respective inlets or outlets that are more directly fluidly connected to the volume radially surrounding the respective filter 46 associated with the respective filter tube 44.

Preferably, each of seals 210, 212 and faces 216 of lid 50, and the corresponding mating structures defined by mount body 42 are oriented at crossing directions, indicated by arrows 222, 224 relative to one another or otherwise at an angle, indicated by dimension 228, relative to one another so as to provide the desired sealed interaction therebetween and such that the engagement between the lid 50 and mount body 42 are not otherwise parallel to one another as disclosed further below. The non-orthogonal and slightly crossing relative orientation associated with the engagement between seals 210, 212 and the respective mating structures of lid 50 and mount body 42, ensure respective seals 210, 212 maintain a sealed interaction between the mating structures when the respective lid 50 and respective mount body 42 are engaged with one another. The non-orthogonal or parallel engagement between the discrete lids 50 and mount bodies 42 allow maintaining the sealed interaction therebetween and across a greater degree of deviation associated with the threaded cooperation between lid 50 and respective mount body 42 without degrading or otherwise detracting from the sealed performance therebetween. The non-orthogonally alignment associated with the interaction between each lid 50 and each mount body 42 maintains sealed interaction therebetween and does so in a manner wherein the discrete seals 210, 212 can slightly deform during operation of the filtering assembly 30 while maintaining a sealed condition of each discrete filter assembly 40 associated with each discrete filtering assembly 30.

Preferably, angle 228 associated with the offset relative to a parallel alignment of the radially oriented interfaces between each lid 50 and each mount body 42 is preferably less than approximately 20° and, more preferably, is approximately 5° from orthogonal relative to the orientation associated with the cooperation of seals 210, 212 relative to lid 50 and/or mount body 42. As used above, the term "approximately" incorporates values of the offset that are greater than machining tolerances associated with forming an orthogonally aligned threaded interface with a sealed interaction and less than 10 degrees.

As alluded to above, and referring to FIGS. 1, 2, and 8, it is appreciated that one or more of fittings 60, 62, 64, 66 can be oriented and/or constructed to be fluidly connected respectively above or respectively below channel 168 associated with each discrete lid 50 and relative to the radially inboard or radially outboard portion of the fluid flow associated with respective filters 46. It is further appreciated that during the formation of each respective mount body 42, discrete bosses 80, 82, 84, 85 are preferably not otherwise fluidly connected therethrough such that subsequent machining processes, such as boring or the like, associated with discrete bosses 80, 82, 84, 85 can be utilized to effectuate the desired fluid conductivity associated with channel 164 of each respective lid 50 and/or to be associated with the filter facing side associated with the use position or location of each discrete lid 50 and/or each discrete mount body 42 relative to a desired resultant filtering assembly 30. It is further appreciated that discrete bosses 80, 82, 84, 85 can be processed in and/or subsequently milled or otherwise machined so as to be provided with cross-sectional fluid flow passages having alternate cross-sectional shapes as determined by the desired flow intended to be provided thereby. That is, it should be appreciated that processing discrete bosses 80, 82 such that both are fluidly connected to a respective side or fluid passage associated with respective lid 50 could provide a lower, the same as, or greater fluid flows as compared to fluid flow processing associated with one of discrete bosses 84, 85. Such considerations improve the versatility associated with the uses and deployment of filtering assembly 30. It is further appreciated that, with appropriate forethought, a plurality of mount bodies 42 could be provided with dissimilar fluid flow characteristics associated therewith such that fluid filtering assemblies 30 can be provided and uniquely configured to effectuate fluid flow treatments distinct to particular applications, particular fluid inlet and inlet flow characteristics and/or fluid conditions and/or constituents or makeup particular to a given application and/or environment.

Figure 11:
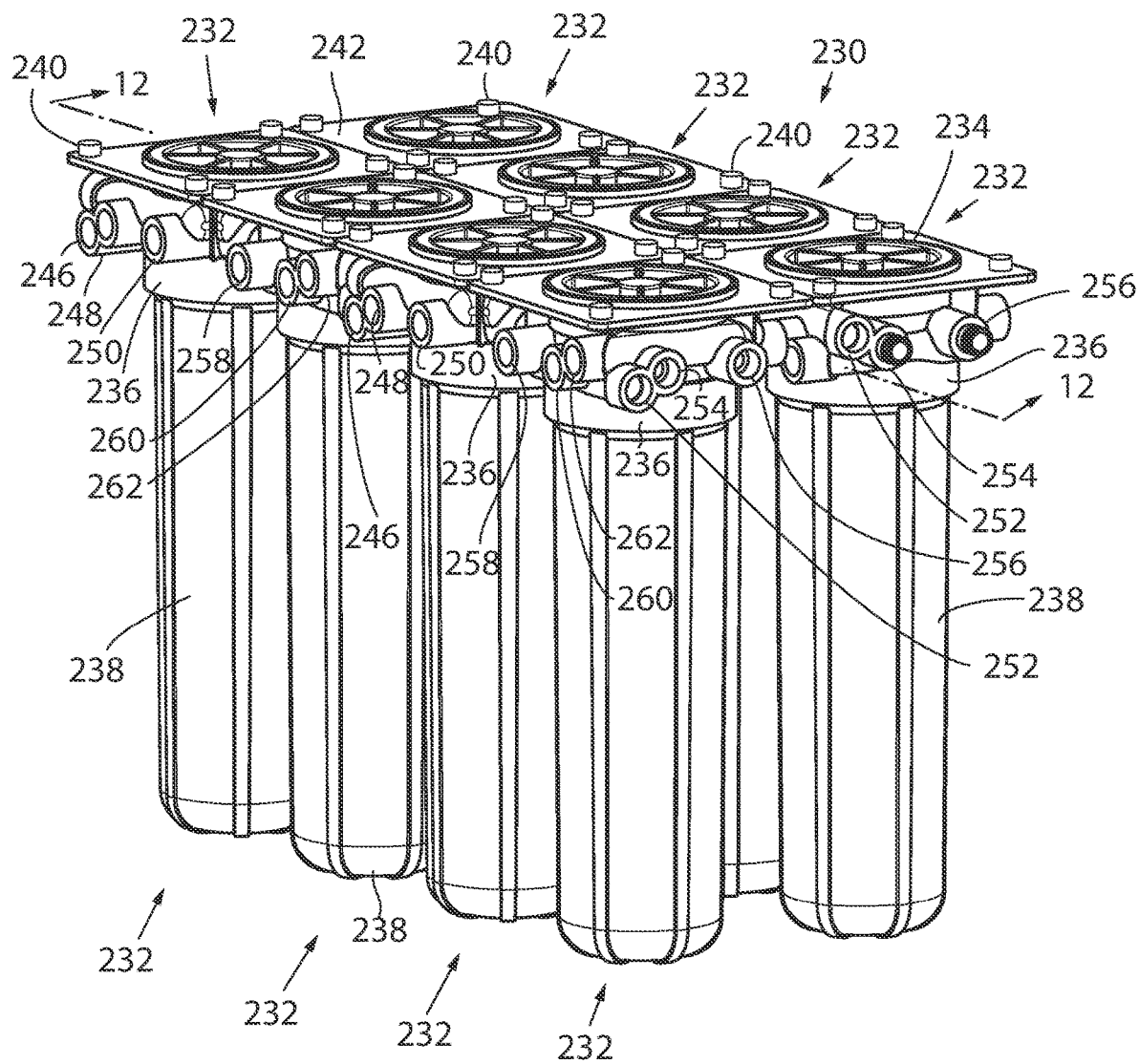
FIG. 11 is a perspective view of filter system or assembly according to the another embodiment of the invention and having eight discrete filter housings that are fluidly connected one another.
Figure 12:
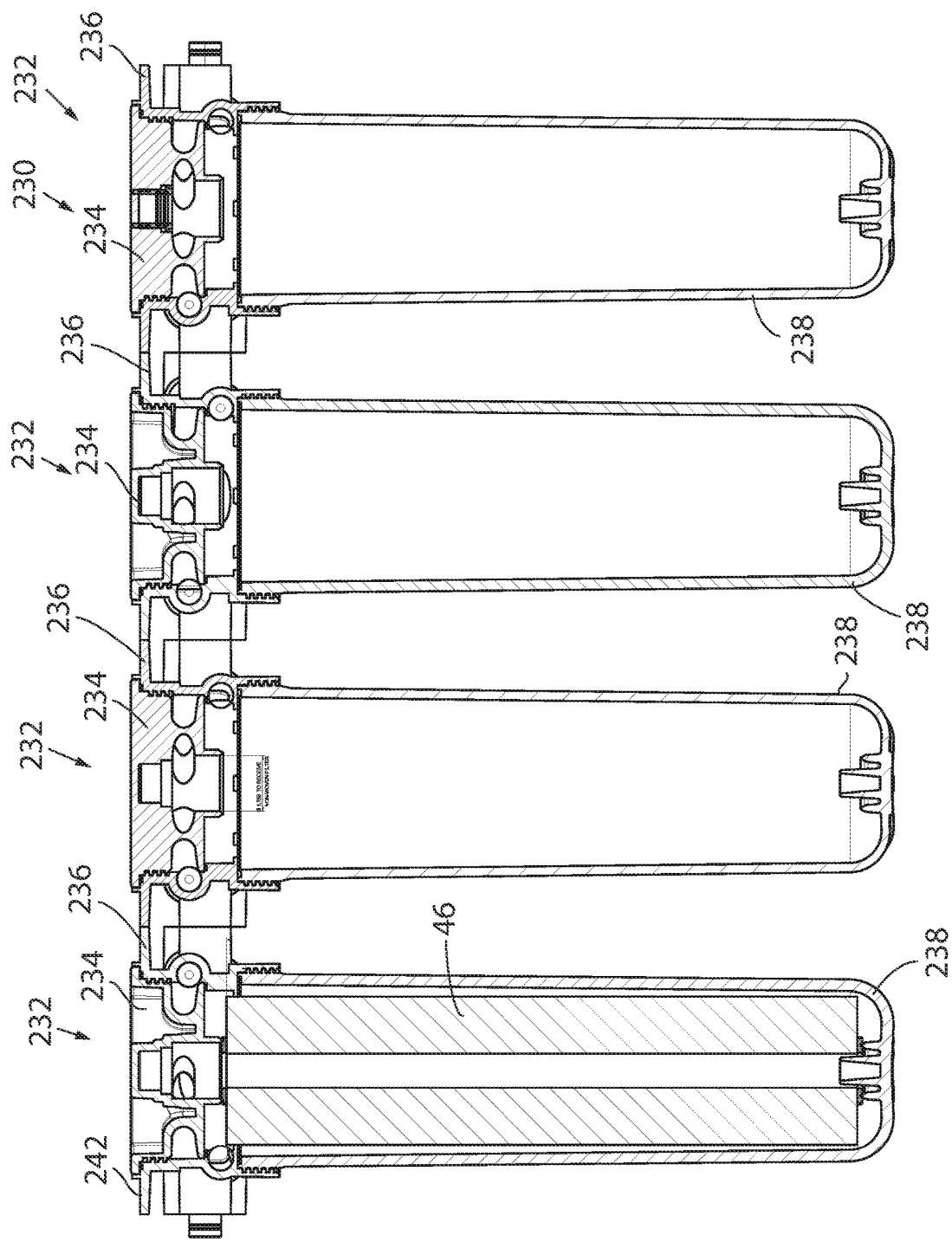
FIG. 12 is a cross section elevation view similar to FIG. 2 of the filter assembly shown in FIG. 11 taken along line 12-12.

For instance, and with reference to FIGS. 11-12, whereas filtering assembly 30 shown in FIG. 1 is provided as a six (6) filter assembly 40 configuration, numerous other filter configurations are envisioned to provide filtering assemblies in accordance with the present invention. FIGS. 11 and 12 show one alternate configuration wherein a filtering system or filtering assembly 230 is provided that includes eight (8) discrete filter assemblies 232. Each filter assembly 232 includes a respective lid 234 that removeably cooperates with a respective mount body 236 that supports a downwardly depending filter sleeve 238. Discrete filters 46 are provided in a plurality of modalities relative to particulate size filtration or capture as well the operating modality associated with the same such as micron filtration, charcoal filtration, infra-red treatment, etc. Preferably, each filter assembly 232 is constructed to cooperate with any discrete filter 46 associated with the above or other operational modalities. Alternatively, it is envisions that the filters 46 and/or filter assemblies 40, 232 be constructed in a manner that prevents undesired relative orientation of the discrete filters 46 relative to one another. For instance, it would be undesirable to provide a smaller particulate micron passage filter upstream relative to the direction of the filtered fluid flow and relative to a respective filter having a larger micron passage filtration characteristic in as much as the larger particulate would be captured by the finer filter and result in premature pollution thereof. Such considerations ensure the desired sequential orientation of the discrete filter assemblies 40, 232 relative to the direction of the fluid flow and the desired fluid characteristics to be obtained.

It is further appreciated that, whether provided as a six, eight, or other number of discrete filter assemblies filtering assembly 30, 230, as the conditions of the fluid stream quality improve, reducing the number or characteristics of the media associated with the discrete media of the discrete filters 46 relative to the fluid flow is subject to be changed. For instance, if an intake water flow improves in quality, condition, or characteristic such that less particulate matter is present and such that the fluid flow isn't subject to dramatic changes in the condition thereof, leaving one or more of the discrete filter assemblies associated with discrete filtering assemblies 30, 230 empty or devoid of an intended filter 46 does not adversely impact the characteristics of the fluid flow therethrough and/or continued use of the respective filtering assembly 30, 230 to achieve the desired resultant flow characteristics or quality.

Regardless of the specific number of filters 46 employed and associated with filtering assembly 230, a plurality of fasteners 240 secure an optional support plate 242 to each discrete mount body 236 in the same manner as disclosed above relative to filtering assembly 30. Like mount bodies 42, each mount body 236 of filtering assembly 230 also includes a plurality of bosses 246, 248, 250, 252, 254, 256, 258, 260, 262 that are oriented along respective discrete sides of each respective mount body 236. It should be appreciated that respective mount bodies 236 may be provided in one or more standard forms and/or constructed to be rotatable relative to one another such that selection of discrete bosses 246-262, and forming a perforation associated therewith during manufacture or assembly of filtering assembly 230, can be selected so as to provide a plurality of fluid flow configurations associated with communicating fluid flow through filtering system 230 and in manners wherein the inlet fluid flow, or the outlet fluid flow, is derived from a single fluid flow input/output or a combination of fluid flow input/outputs from mount bodies 236 associated with one or more discrete adjacent filter assemblies 230, respectively. That is, it should be appreciated that each of mount bodies 236 can be rotated to a relative desired position to effectuate the desired fluid conductivity between each discrete mount body 236 and one or more adjacent mount bodies 236 associated with adjacent filter assemblies 232 so as to form filtering assemblies 230 that provide various filtration performance but which are formed from a combination of mount bodies 236 having initially uniform constructions prior to the individualization of the discrete mount bodies 236, and the filter assembly 232 defined thereby, via perforation of the discrete desired bosses 246, 248, 250, 252, 254, 256, 258, 260, 262, associated with achieving the desired fluid flow path and filtration performance associated with filtering assembly 230. Although filtering assembly 230 is shown as having eight filter assemblies 232, it is appreciated that filtering assemblies having virtually any number of discrete filter assemblies are envisioned and envisioned as being suitable to infinite numbers of combinations of discrete fluid flow qualities and conditions.

It should be further appreciated that, as each filter assembly of each of filtering assemblies 30, 230, includes a generally cantilevered filter sleeve that threadably cooperates with a respective mount body from a direction generally opposite the respective lid, each filter sleeve or tube is configured to be removable from the respective mount body in a generally opposite direction relative to the respective lid associated therewith. Such a consideration further improves the versatility associated with deployment and/or installation of a discrete filtering assembly in as much as space limitations periodically dictate the layout of respective filter assemblies. Providing bidirectional access to the space associated with extraction or replacement of discrete filters further improves the versatility associated with utilization of the respective filtering systems disclosed herein.

Therefore, in accordance with one embodiment of the application, a variable configuration modular fluid filtering assembly is disclosed that includes one or more discrete filter housing assemblies that each include a mount body that is constructed to support a cap and a filter sleeve. A plurality of bosses are formed on radially outward facing sides of the mount body and are each discretely selectable to fluidly connect the discrete mount body to one another to provide a desired flow characteristic of the discrete filter assembly arrangement. Preferably, each discrete filter assembly includes a seal arrangement disposed between the cap and the mount body and which orients the sealing interface therebetween at an acute angle relative to an axis of rotation of the cap relative to the mount body when the cap and mount body are engaged with one another. Such a fluid filtering assembly can be quickly and conveniently configured to achieve a desired filtration performance and serviceable in a manner that improves the ability to seal each filter housing assembly during service processes.

Another embodiment that is combinable with one or more of the features, aspects, or objects of the embodiment disclosed above includes a fluid filtering assembly having a support housing. At least one fluid inlet boss and at least one fluid outlet boss are each formed in a radially outward directed surface of the support housing. A filter sleeve extends in a first direction from the support housing and has an elongate shape that is constructed to accommodate a filter being disposed therein. The assembly includes a top cap that threadably cooperates with the support housing from a direction opposite the filter sleeve and engages the filter sleeve. An inlet fluid flow passage and an outlet fluid flow passage are defined by the top cap and oriented to be respectively fluidly aligned with the at least one fluid inlet boss and the at least one fluid outlet boss when the top cap is engaged with the support housing and the filter media is disposed in the filter sleeve.

A further embodiment that is combinable or useable with one or more of the features, aspects, or objects of the embodiments disclosed above includes a fluid filtering assembly having a mount body and at least one fluid flow inlet boss and at least one fluid flow outlet boss formed in an outward radially directed surface of the mount body. The assembly includes a filter sleeve that extends away from the mount body and which defines a blind opening that is shaped to receive a filter. The assembly further includes a cover that is removable and sealingly cooperates with a bore formed in the mount body from a direction opposite the filter sleeve via cooperation of a threaded surface formed on a radially outward surface of the cover and a threaded surface formed on a radially inward facing surface of the mount body. A channel that is axially offset from the threaded surfaces of the cover and the mount body is formed in one of the mount body and cover and a seal is disposed in the channel. A seat is defined by the other of the mount body and the cover and is oriented to engage the seal when the cover is engaged with the mount body such that the seat and the seal engage one another at an acute angle relative to an axis of rotation of the cover relative to the mount body when the threaded surfaces are engaged with one another.

Another embodiment that is useable with one or more of the features, aspects, or objects disclosed above includes a method of forming a filter housing assembly. The method includes providing a mount body that is defined by a bore that passes through the mount body. A plurality of bosses are formed on a radially outward oriented surface of the mount body and oriented such that at least one of the plurality of bosses is constructed to be able to provide a discrete flow cross-section from a range of flow cross-sections. A cap that removeably and sealingly cooperates with a respective end of the bore of the mount body is provided and is shaped to engage a filter to direct a fluid flow passed into the mount body from an opening associated with one of the plurality of bosses to another opening associated with another of the plurality of bosses.

The present invention not to be limited to the embodiments and illustrations expressly contained herein and it is appreciated that modified forms of these embodiments, including portions of the embodiments and combinations of elements of different embodiments, come within the scope of the following claims.

We claim:

1. A fluid filtering assembly comprising:
    a support housing defined by an upward directed surface, a downward directed surface, and a through-bore that extends along an axis through the support housing between the upward directed surface and the downward directed surface;
    at least one fluid inlet boss and at least one fluid outlet boss that are each formed in a radially outward directed surface of the support housing between the upward directed surface and the downward directed surface defined by the support housing;

a filter sleeve that removeably cooperates with and extends in a cantilevered manner away from the downward directed surface of the support housing and has an elongate shape constructed to accommodate a filter media being disposed therein;

a top cap that threadably cooperates with the upward directed surface of the support housing so that the top cap is located opposite the filter sleeve and each of the top cap and the filter sleeve are oriented along the axis defined by the through-bore of the support housing when secured to the support housing and the top cap engages the filter sleeve such that the filter media is removeable from the filter sleeve via either of passage of the filter media through the through-bore defined by the support housing when the top cap is removed therefrom and removal of the filter sleeve from the support housing; and an inlet fluid flow passage and an outlet fluid flow passage defined by the top cap that are each physically aligned with the at least one fluid inlet boss and the at least one fluid outlet boss, respectively, when the top cap is engaged with the support housing and the filter media is disposed in the filter sleeve such the filter media is disposed in the fluid path between the at least one fluid inlet boss of the support housing and the inlet fluid flow passage defined by the top cap and the outlet fluid flow passage of the top cap and the at least one fluid outlet boss of the support housing a seat formed in a closed end of the filter sleeve and constructed to cooperate with an end of a filter the filter media disposed in the filter sleeve and prevent fluid flow in a radial direction around the end of the filter media, wherein the top cap further comprises a first channel formed in a portion of an outward radially directed surface and that is in fluid communication with a portion of a volume defined by the filter sleeve that is radially outward of the filter media and a second channel that is fluidly isolated from the first channel and in fluid communication with a radially oriented core of the filter media.

2. The fluid filtering assembly of claim 1 wherein the at least one fluid inlet boss is further defined as at least two inlet bosses.

3. The fluid filtering assembly of claim 2 wherein each of the at least two inlet bosses are formed on different radially directed faces of the support housing.

4. The fluid filtering assembly of claim 1 wherein the at least one fluid outlet boss is further defined as at least two outlet bosses.

5. The fluid filtering assembly of claim 4 wherein each of the at least two outlet bosses are formed on different radially directed faces of the support housing.

6. The fluid filtering assembly of claim 1 further comprising a seal disposed between an interface of the top cap and the support housing and wherein the interface is oriented at an angle relative to an axial engagement between the top cap and the support housing.

7. A fluid filtering assembly comprising:
a mount body defined by an upward directed surface, a downward directed surface, and a through-bore formed through the mount body between the upward directed surface and the downward directed surface;
at least one fluid flow inlet boss and at least one fluid flow outlet boss formed in an outward radially directed surface of the mount body;

a filter sleeve that extends in a cantilevered manner away from the downwardly directed surface of the mount body and defines a blind opening that is shaped to receive a filter defined by a longitudinal axis that is aligned with an axis of the through-bore of the mount body;

a cover that is removable and sealingly cooperates with upward directed surface of the mount body so that the cover overlies the through-bore formed in the mount body and the filter sleeve and engages the mount body at a location opposite the filter sleeve along the longitudinal axis of the filter sleeve via cooperation of a threaded surface formed on a radially outward surface of the cover and a threaded surface formed on a radially inward facing surface of the mount body such that the filter can be removed from the filter sleeve via either of removal of the filter sleeve from the mount body and removal of the cover from the mount body such that the filter can be translated through the through-bore defined by the mount body when the cover is removed therefrom;

a channel formed in one of the mount body and cover, the channel being axially offset from the threaded surfaces of the cover and the mount body;

a seal disposed in the channel; and a seat defined by the other of the mount body and the cover, the seat being oriented to engage the seal when the cover is engaged with the mount body and wherein the seat and the seal engage one another at an acute angle relative to an axis of rotation of the cover relative to the mount body when the threaded surfaces are engaged with one another a seat formed in a closed end of the filter sleeve and constructed to cooperate with an end of a filter the filter media disposed in the filter sleeve and prevent fluid flow in a radial direction around the end of the filter media, wherein the top cap further comprises a first channel formed in a portion of an outward radially directed surface and that is in fluid communication with a portion of a volume defined by the filter sleeve that is radially outward of the filter media and a second channel that is fluidly isolated from the first channel and in fluid communication with a radially oriented core of the filter media.

8. The fluid filtering assembly of claim 7 wherein the acute angle is no less than 3 degrees.

9. The fluid filtering assembly of claim 8 wherein the acute angle is 5 degrees.

10. The fluid filtering assembly of claim 7 further comprising another mount body, another filter sleeve, and another cover fluidly connected to the fluid filtering assembly and each being constructed the same as the mount body, the filter sleeve, and the cover, respectively.

11. The fluid filtering assembly of claim 10 further comprising a connector supported by the fluid flow outlet boss of the mount body and a fluid flow inlet boss of the another mount body.

12. The fluid filtering assembly of claim 7 wherein each of the at least one fluid flow inlet boss and the at least one fluid flow outlet boss are independently sizeable depending upon a desired fluid flow intended to be communicated therethrough.

13. The fluid filtering assembly of claim 12 further comprising a first flow passage and a second flow passage that are defined by the cover and which define a single flow path through the fluid filtering assembly between the at least one fluid flow inlet boss and at least one fluid flow outlet boss and with the filter disposed therebetween.

\* \* \* \* \*